US012536994B2

(12) United States Patent
Kwag et al.

(10) Patent No.: US 12,536,994 B2
(45) Date of Patent: Jan. 27, 2026

(54) APPARATUS FOR CLASSIFYING SOUNDS BASED ON NEURAL CODE IN SPIKING NEURAL NETWORK AND METHOD THEREOF

(71) Applicant: Korea University Research and Business Foundation, Seoul (KR)

(72) Inventors: Jee hyun Kwag, Seoul (KR); Ki sung Shin, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 230 days.

(21) Appl. No.: 18/113,192

(22) Filed: Apr. 26, 2023

(65) Prior Publication Data

US 2023/0298573 A1 Sep. 21, 2023

(51) Int. Cl.
*G10L 15/16* (2006.01)
*G06N 3/049* (2023.01)
(Continued)

(52) U.S. Cl.
CPC .............. *G10L 15/16* (2013.01); *G06N 3/049* (2013.01); *G06N 3/08* (2013.01); *G10L 25/15* (2013.01); *G10L 25/30* (2013.01); *G10L 25/90* (2013.01)

(58) Field of Classification Search
CPC ......... G10L 15/16; G10L 25/15; G10L 25/30; G10L 25/90; G06N 3/049; G06N 3/08
See application file for complete search history.

(56) References Cited

U.S. PATENT DOCUMENTS

2017/0200078 A1* 7/2017 Bichler .................. G06N 3/045
2018/0330228 A1* 11/2018 Koelmans ............. G06N 3/088
(Continued)

FOREIGN PATENT DOCUMENTS

KR 10-2016-0123312 A 10/2016
KR 10-2259299 B1 6/2021
KR 10-2344678 B1 12/2021
KR 10-2360924 B1 2/2022

OTHER PUBLICATIONS

De Oliveira Neto, José Rodrigues, João Paulo Cerquinho Cajueiro, and João Ranhel. "Neural encoding and spike generation for Spiking Neural Networks implemented in FPGA." 2015 International Conference on Electronics, Communications and Computers (CONIELECOMP). IEEE, 2015. (Year: 2015).*
(Continued)

*Primary Examiner* — Jesse S Pullias
*Assistant Examiner* — Theodore Withey
(74) *Attorney, Agent, or Firm* — NSIP Law

(57) ABSTRACT

A method of classifying sounds based on a neural code in a spiking neural network includes: receiving sounds to be classified and digitally converting the received sounds into sound data; preprocessing the sound data using a multiple neural code-based encoding method including rate code encoding and synchrony code encoding; inputting the pre-processed sound data to a biological spiking neural network to extract features; performing biological spike timing-dependent plasticity (STDP) rule-based learning using the extracted features; and performing classification of the sounds according to neural code propagation characteristics using a test dataset according to a result of the performing of the learning.

6 Claims, 9 Drawing Sheets

(51) Int. Cl.

*G06N 3/08* (2023.01)
*G10L 25/15* (2013.01)
*G10L 25/30* (2013.01)
*G10L 25/90* (2013.01)

(56) References Cited

U.S. PATENT DOCUMENTS

| | | | | |
|---|---|---|---|---|
| 2019/0236443 | A1 | 8/2019 | Koelmans et al. | |
| 2020/0184325 | A1 * | 6/2020 | Moraitis | G06N 3/088 |
| 2021/0357725 | A1 * | 11/2021 | Cherubini | G06N 3/084 |
| 2023/0004777 | A1 * | 1/2023 | Kim | G06N 3/08 |
| 2023/0260503 | A1 * | 8/2023 | Lee | G10L 13/0335 704/259 |
| 2023/0368004 | A1 * | 11/2023 | Zjajo | G06N 3/065 |

OTHER PUBLICATIONS

Pan, Zihan, et al. "Neural population coding for effective temporal classification." 2019 International Joint Conference on Neural Networks (IJCNN). IEEE, 2019. (Year: 2019).*

Peterson, Dylan George. "A biologically inspired supervised learning rule for audio classification with spiking neural networks." (2021). (Year: 2021).*

Wu, Jibin, et al. "A spiking neural network framework for robust sound classification." Frontiers in neuroscience 12 (2018): 836. (Year: 2018).*

Cernak, Milos, et al. "Composition of deep and spiking neural networks for very low bit rate speech coding." IEEE/ACM Transactions on Audio, Speech, and Language Processing 24.12 (2016): 2301-2312. (Year: 2016).*

Korean Office Action issued on Feb. 13, 2023 in counterpart Korean Patent Application No. 10-2022-0023837 (6 pages in Korean).

Wu, Jibin, et al. "A spiking neural network framework for robust sound classification." *Frontiers in neuroscience* vol. 12 Article 836 (Nov. 19, 2018).

Zhang, Zhixuan, and Qi Liu. "Spike-event-driven deep spiking neural network with temporal encoding." *IEEE Signal Processing Letters* vol. 28 (Feb. 15, 2021): pp. 484-488.

Wu, Jibin, et al. "Deep spiking neural networks for large vocabulary automatic speech recognition." *Frontiers in neuroscience* vol. 14 Article 199 (Mar. 17, 2020).

* cited by examiner

: Time axis

: Encoded spike timing for waveform of sound input at specific time

APPARATUS FOR CLASSIFYING SOUNDS BASED ON NEURAL CODE IN SPIKING NEURAL NETWORK AND METHOD THEREOF

CROSS REFERENCE TO RELATED APPLICATIONS

This application claims priority to and the benefit of Korean Patent Application No. 10-2022-0023837, filed on Feb. 23, 2022, the disclosure of which is incorporated herein by reference in its entirety.

FIELD OF THE INVENTION

The present invention relates to an apparatus for classifying sounds based on a neural code in a spiking neural network, and a method thereof, and more particularly, to an apparatus for classifying sounds based on a neural code in a spiking neural network for classifying sounds according to a difference in propagation characteristics under various spike timing-dependent plasticity (STDP) learning rules by encoding sound input with a rate code and a synchrony code in the spiking neural network, and a method thereof.

DESCRIPTION OF RELATED ART

Spiking neural networks (SNNs) are a field of artificial neural networks that more closely simulate a natural neural network than the conventional machine learning-based neural network, and are neural networks that process information by generating a rapid change in membrane potential called a spike when each neuron in the neural network has a state value called the membrane potential and the state value exceeds a certain threshold according to values transmitted from pre-synaptic neurons of a previous layer.

In addition, the classification of sound input in the neural network may be classified in operations (e.g., human sound, animal cry, car horn, etc.) of classifying various types of sounds provided as inputs to the neural network and operations (e.g., classification according to pitch of a human voice, distinguishing words from a human voice, etc.) of distinguishing different characteristics from the same type.

The classification of the sound input using the conventional spiking neural network has been performed using an error backpropagation learning method mainly used in a general neural network. The error backpropagation learning method is the most widely used learning method in the field of machine learning. However, the error backpropagation learning method does not meet derivative impossible properties of neurons in a spiking neural network divided into spike and idle states due to a derivative operation included in a learning process, and thus has a problem of not being directly applicable and requiring approximation, etc., and the error backpropagation learning method requires many operations for learning, and thus has a problem of generating heat from physical hardware.

In addition, with the conventional error backpropagation-based learning, preprocessing of extracting a feature vector needs to be performed on the sound input through a separate computing algorithm called Mel-Frequency Cepstral Coefficient (MFCC). The use of MFCC limits the possibility of extracting biological features of the spiking neural network using features of inputs extracted in advance in addition to the features extracted through the learning process, and since MFCC makes it difficult to apply other biological learning rules, MFCC has a problem of not maximizing the biological advantage of the spiking neural network.

In addition, the conventional spiking neural network that does not use the error backpropagation learning rules is performed based on a rate code by considering that the fact that sounds having different pitches may be described by a difference in frequency is similar to a rate code method which is one method of encoding stimulation information of nerve cells. However, since sound is a combination of various factors such as volume and timbre as well as pitch, there is a problem in that it is difficult to distinguish various features of sound input only with the rate code.

The related art of the present invention is disclosed in Korean Patent Publication No. 10-2344678 (Published on Dec. 28, 2021).

DESCRIPTION OF INVENTION

Problems to be Solved

The present invention is directed to providing an apparatus for classifying sounds based on a neural code in a spiking neural network for classifying sounds according to a difference in propagation characteristics under various spike timing-dependent plasticity (STDP) learning rules by encoding sound input with a rate code and a synchrony code in the spiking neural network, and a method thereof.

Means to Solve Problems

According to an aspect of the present invention, there is provided a method of classifying sounds based on a neural code in a spiking neural network, including: receiving sounds to be classified and digitally converting the received sounds into sound data; preprocessing the sound data using a multiple neural code-based encoding method including rate code encoding and synchrony code encoding; inputting the preprocessed sound data to a biological spiking neural network and extracting features; performing biological STDP rule-based learning using the extracted features; and performing classification of the sounds according to neural code propagation characteristics using a test dataset according to a result of the performing of the learning.

In the preprocessing, the sound data may be preprocessed by encoding a pitch of sound corresponding to a frequency with a rate code encoding for encoding a pitch of sound, and an intensity of sound corresponding to amplitude and a tone of sound corresponding to a waveform with a synchrony code encoding for encoding a timbre of sound.

In the extracting of the features, a rate code encoding result and a synchrony code encoding result may be input to the biological spiking neural network to extract features corresponding to a propagation pattern of a rate code and a propagation pattern of a synchrony code from the neural network, respectively.

In the performing of the learning, unsupervised learning may be performed on each of the extracted features for each combination of one or more predefined STDP rules.

The STDP rule may be predefined in a combination of Hebbian STDP and anti-Hebbian STDP determining a ratio of strengthening and weakening of synapses or symmetric STDP and asymmetric STDP determining whether to strengthen or weaken synapses depending on which of the two neurons generates the spike first.

In the performing of the classification of the sounds, when the performing of the learning is completed, the classification of the sounds may be performed using a test dataset finally selected by comparing each spiking neural network structure and a combination of the STDP rules.

According to another aspect of the present invention, there is provided an apparatus for classifying sounds based on a neural code in a spiking neural network, including: an input conversion unit configured to receive sounds to be classified and digitally convert the received sounds into sound data; a preprocessing unit configured to preprocess the sound data using a multiple neural code-based encoding method including rate code encoding and synchrony code encoding; a feature extraction unit configured to input the preprocessed sound data to a biological spiking neural network to extract features; a learning unit configured to perform biological spike timing-dependent plasticity (STDP) rule-based learning using the extracted features; and a sound classification unit configured to perform classification of the sounds according to neural code propagation characteristics using a test dataset according to a result of the learning performance.

The preprocessing unit may preprocess the sound data by encoding a pitch of sound corresponding to a frequency with a rate code encoding for encoding a pitch of sound, and an intensity of sound corresponding to amplitude and a tone of sound corresponding to a waveform with a synchrony code encoding for encoding a timbre of sound.

The feature extraction unit may input a rate code encoding result and a synchrony code encoding result to the biological spiking neural network to extract features corresponding to a propagation pattern of a rate code and a propagation pattern of a synchrony code from the neural network, respectively.

The learning unit may perform unsupervised learning on each of the extracted features for each combination of one or more predefined STDP rules.

The STDP rule may be predefined in combination of Hebbian STDP and anti-Hebbian STDP determining a ratio of strengthening and weakening of synapses or symmetric STDP and asymmetric STDP determining whether to strengthening or weakening synapses depending on which of the two neurons generates the spike first.

When the learning performance is completed, the sound classification unit may perform the classification of the sounds using a test dataset finally selected by comparing each spiking neural network structure and a combination of the STDP rules.

Effects of Invention

According to the embodiment of the present invention, by using an encoding method of pitch and timbre corresponding to a rate code and a synchrony code, respectively, based on a biological encoding method of sound inputs in a spiking neural network to utilize a differences in characteristics of complex and subtle sound inputs for learning the spiking neural network, it is possible to improve the performance of a classification operation.

DETAILED DESCRIPTION OF EXEMPLARY EMBODIMENTS

Hereinafter, exemplary embodiments of the present invention will be described in detail with reference to the accompanying drawings. In this process, thicknesses of lines, sizes of components, and the like illustrated in the accompanying drawings may be exaggerated for clearness of explanation and convenience.

In addition, terms to be described below are defined in consideration of functions in the present disclosure and may be construed in different ways according to the intention of users or practice. Therefore, these terms should be defined on the basis of the content throughout the present specification.

Hereinafter, preferred embodiments of the present invention will be described in more detail with reference to the accompanying drawings.

First, an apparatus for classifying sounds based on a neural code in a spiking neural network according to embodiments of the present invention will be described with reference to FIGS. 1 to 5.

Figure 1:
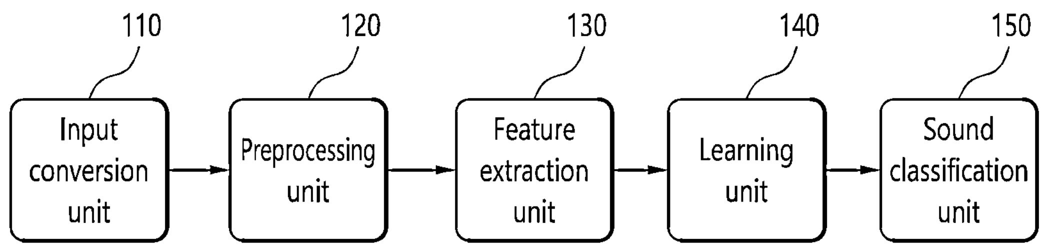
FIG. 1 is a block diagram illustrating an apparatus for classifying sounds based on a neural code in a spiking neural network according to an embodiment of the present invention.

FIG. 1 is a block diagram illustrating an apparatus for classifying sounds based on a neural code in a spiking neural network according to an embodiment of the present invention.

As illustrated in FIG. 1, an apparatus 100 for classifying sounds based on a neural code in a spiking neural network according to the embodiment of the present invention includes an input conversion unit 110, a preprocessing unit 120, a feature extraction unit 130, a learning unit 140, and a sound classification unit 150.

First, the input conversion unit 110 receives sounds to be classified and digitally converts the received sounds into sound data.

That is, the received sounds are digitally converted to use the digitized sounds as input data.

The preprocessing unit 120 preprocesses sound data digitized by the input conversion unit 110 using a multiple neural code-based encoding method including rate code encoding and synchrony code encoding.

In an embodiment of the present invention, a neural code technique is a method of transferring information between brain regions or neurons, and includes a rate code method in which input information is encoded by a spike firing rate of each neuron, a synchrony code method in which input information is encoded by temporally synchronized spikes of a specific neuron population, and the like.

Therefore, the preprocessing unit 120 is preprocessed by encoding a pitch of sound corresponding to a frequency with a rate code encoding for encoding a pitch of sound, and an intensity of sound corresponding to amplitude and a tone of sound corresponding to a waveform with a synchrony code encoding for encoding a timbre of sound.

That is, among the three elements (pitch, intensity, and tone) of sound, the pitch (frequency) corresponds to the rate code from the viewpoint that the stimulus is encoded with the firing probability of nerve cells, and the intensity (amplitude) and the tone (waveform) correspond to the synchrony code from the viewpoint that the stimulus is encoded with the synchronized firing of some of the nerve cell populations.

Figure 2:
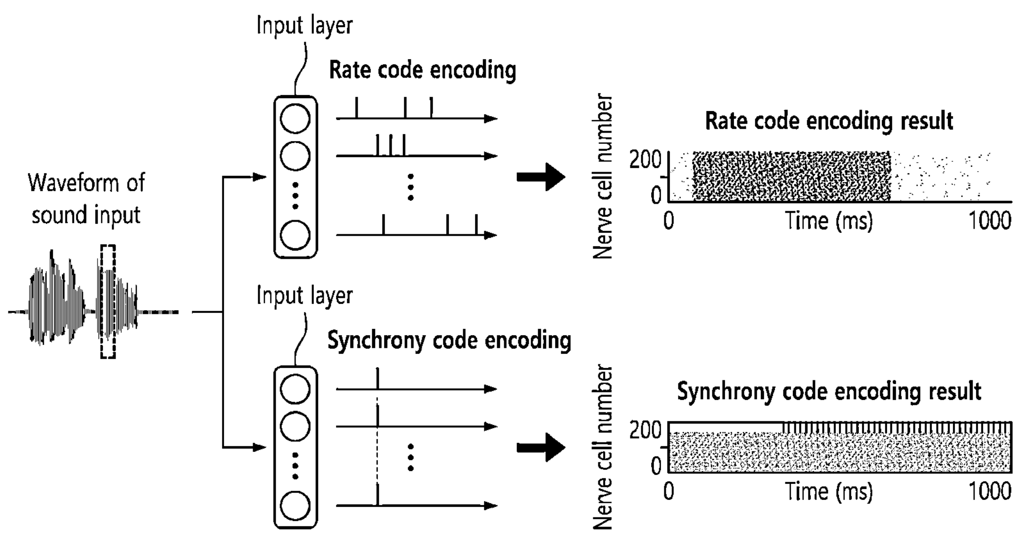
FIG. 2 is a diagram for describing a process of preprocessing sound data using a multi-neural code-based encoding method in an embodiment of the present invention.

FIG. 2 is a diagram for describing a process of preprocessing sound data using a multi-neural code-based encoding method in an embodiment of the present invention.

As illustrated in FIG. 2, each encoding result may be represented using rate code-encoded spike timing and synchrony code-encoded spike timing for a waveform of sound data input at a specific time.

That is, in the embodiment of the present invention, a neural code encoding technique of substituting the sound data input by the spike input is used to provide a sound dataset as an input to the constructed spiking neural network.

First, according to the rate code-based encoding method, the time-dependent frequency information of sound over time is encoded with the average firing rate of neurons in the input layer. In this case, the firing timing of each neuron is implemented to follow a Poisson distribution, and the average firing rate according to frequency is as shown in Equation 1 below.

$$\text{Average firing rate (Hz)} = \frac{\text{Frequency of current input data}}{\text{Highest frequency in dataset}} \quad \text{[Equation 1]}$$

In addition, according to the synchrony code-based encoding method, the timbre of sound is encoded, and a method in which synchronized inputs are provided only to neurons of an arbitrary input layer corresponding to the number proportional to the amplitude of the waveform based on the waveform over time. In this case, the number of neurons in the synchronized input layer receiving the input is as shown in Equation 2 below.

$$\text{Number of synchronized neurons} = \frac{\text{Waveform amplitude of current data}}{\text{Largest waveform amplitude in dataset}} \quad \text{[Equation 2]}$$

The feature extraction unit 130 extracts features by inputting the sound data preprocessed by the preprocessing unit 120 to the biological spiking neural network.

In this case, the feature extraction unit 130 inputs the rate code encoding result and the synchrony code encoding result to the biological spiking neural network to extract features corresponding to a propagation pattern of a rate code and a propagation pattern of a synchrony code from the neural network, respectively.

The biological spiking neural network according to the embodiment of the present invention is based on a Hodgkin-Huxley model which is a mathematical model that describes membrane potential dynamics of neurons and a generation of a spike. The Hodgkin-Huxley model is a mathematical model of various excitatory and inhibitory neurons that may mimic intrinsic characteristics, spiking patterns, and the like measured through experiments on the auditory cortex responsible for processing auditory information in a biological brain using a neuron simulator that is a representative neural network simulator. A mathematical model representing a membrane potential state of the neuron model is as shown in Equation 3 below.

$$\frac{C_m dV_m}{dt} = -(I_{leak} + I_{Na} + I_{Kd} + I_{Ka} + I_{Km} + I_h). \quad \text{[Equation 3]}$$

$$I_{ion} = g_{ion}(V_m - E_{ion}),\ \text{ion} \in (\text{leak}, Na, Kd, Ka, Km, h).$$

Here, $C_m dV_m$ denotes a total current through a membrane, $V_m$ denotes a resting potential, $I_{leak}$ denotes a leakage current, $I_{na}$ denotes a current through a sodium channel, $I_{kd}$ denotes a current through a delay rectifier potassium channel, $I_{ka}$ denotes a current through an A-type potassium channel, $I_{km}$ denotes the current through an M-type potassium channel, $I_h$ denotes a current through a h-current channel, $g_{ion}$ denotes conductance of a given ion channel, and $E_{ion}$ denotes a reversal potential of that corresponding ion channel.

The mathematical synapse model that simulates the synaptic action measured through the experiments on the auditory cortex of the biological brain using a double-exponential synapse model that describes, with an equation having two exponential terms, an action of a synapse as a connection structure between neurons is shown in Equation 4 below.

$$I_{syn}(t) = g_{max} \times \text{factor} \times \left(-e^{-\frac{\tau}{\tau_{rise}}} + -e^{-\frac{\tau}{\tau_{decay}}}\right) \times (V_m - E_{syn}), \quad \text{[Equation 4]}$$

$$\text{factor} = 1 \Big/ \left(-e^{-\frac{\tau_p}{\tau_{rise}}} + -e^{-\frac{\tau_p}{\tau_{decay}}}\right)$$

$$\tau_p = \tau_{rise} \times \tau_{decay} \times \log(\tau_{rise}/\tau_{decay})/(\tau_{rise} - \tau_{decay})$$

Here, $I_{syn}$ denotes a total synaptic current, $g_{max}$ denotes maximum synaptic conductance, factor denotes a normalization factor, $\tau_{rise}$ denotes a rise time constant, $\tau_{decay}$ denotes a delay time constant, $V_m$ denotes a membrane potential, and $E_{syn}$ denotes a reversal potential.

Figure 3:
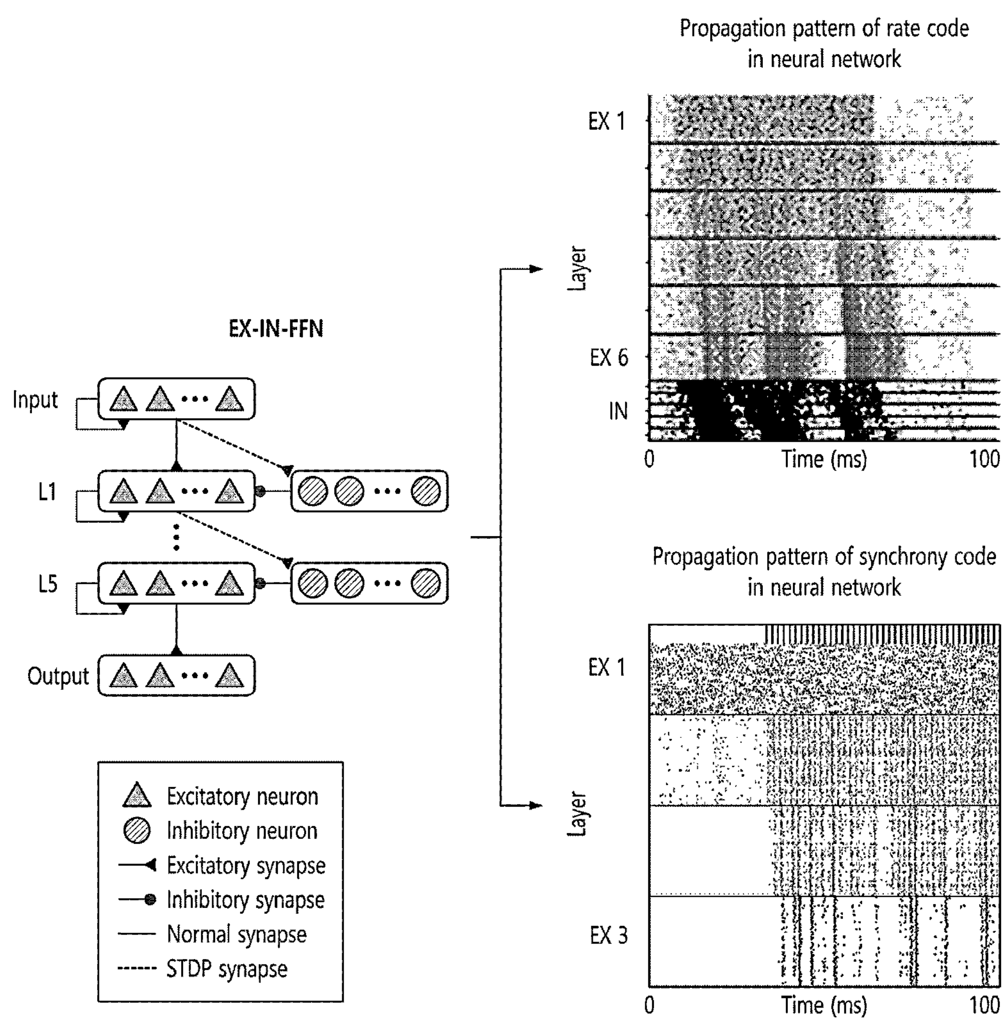
FIG. 3 is a diagram illustrating a propagation pattern of a rate code and a propagation pattern of a synchrony code provided as inputs to a neural network in an embodiment of the present invention.

FIG. 3 is a diagram illustrating a propagation pattern of a rate code and a propagation pattern of a synchrony code provided as inputs to a neural network in an embodiment of the present invention.

The feature extraction unit 130 inputs a rate code encoding result and a synchrony code encoding result to the biological spiking neural network structure in which the connectivity with the excitatory and inhibitory nerve cells illustrated on the left side of FIG. 3 is reflected, thereby extracting the features corresponding to the propagation pattern of the rate code and the propagation pattern of the synchrony code in the neural network illustrated on the right side of FIG. 3, respectively.

That is, in an embodiment of the present invention, a multi-layered sound input classification spiking neural network that mimics a hierarchical structure of cortical regions of a brain may be constructed using an excitatory neuron model, an inhibitory neuron model, and a synapse model.

In this case, since sufficient numbers of neurons are required for the firing rate and synchrony code to be meaningful, the numbers of neurons in each layer may be approximately 400 excitatory neurons and 100 inhibitory neurons, and it is preferable to determine the ratio of excitatory and inhibitory neurons by reflecting the ratio of neurons found in an actual biological brain. Likewise, the connections between the respective layers are also configured to form synapse structures for an arbitrary 20% of neurons in the previous layer by reflecting the cortical connectivity in the biological brain.

In this case, to acquire a classification result of the sound input, as illustrated on the left side of FIG. 3, a final output layer may include as many excitatory neurons as the number of classes in the classification operation.

Further, the learning unit 140 performs learning based on the biological spike timing-dependent plasticity (STDP) rules using the features extracted by the feature extraction unit 130.

In this case, the learning unit 140 performs unsupervised learning on the features extracted by the feature extraction unit 130 for each combination of one or more predefined STDP rules.

Here, the unsupervised learning is a learning method in which the correct answer of the input to the network is not provided.

The STDP rule may be predefined in a combination of Hebbian STDP and anti-Hebbian STDP determining a ratio of strengthening and weakening of synapses or symmetric STDP and asymmetric STDP determining whether to strengthen or weaken synapses depending on which of the two neurons generates the spike first.

Figure 4A:
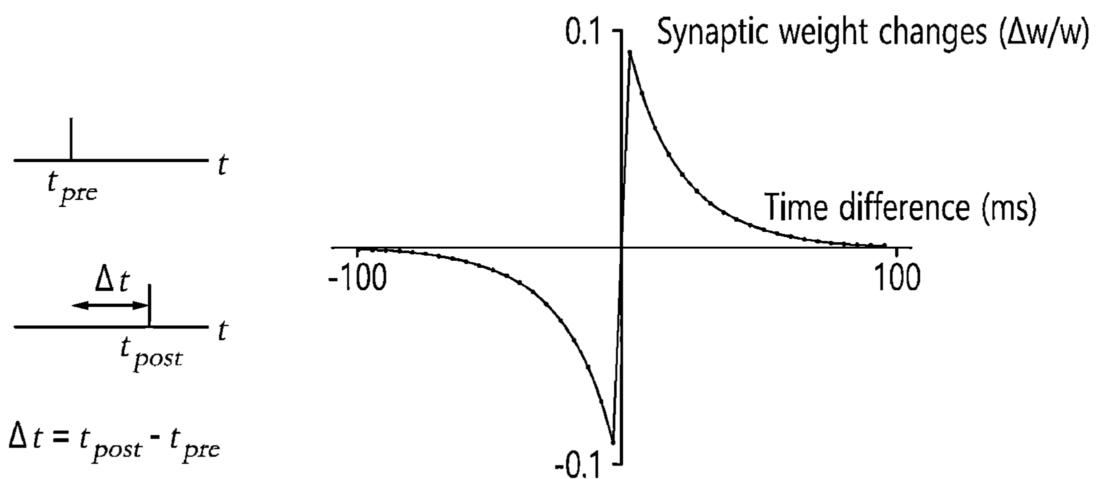
FIGS. 4A and 4B are exemplary diagrams illustrating a change in synaptic weight according to various types of STDP rules in an embodiment of the present invention.
Figure 4B:
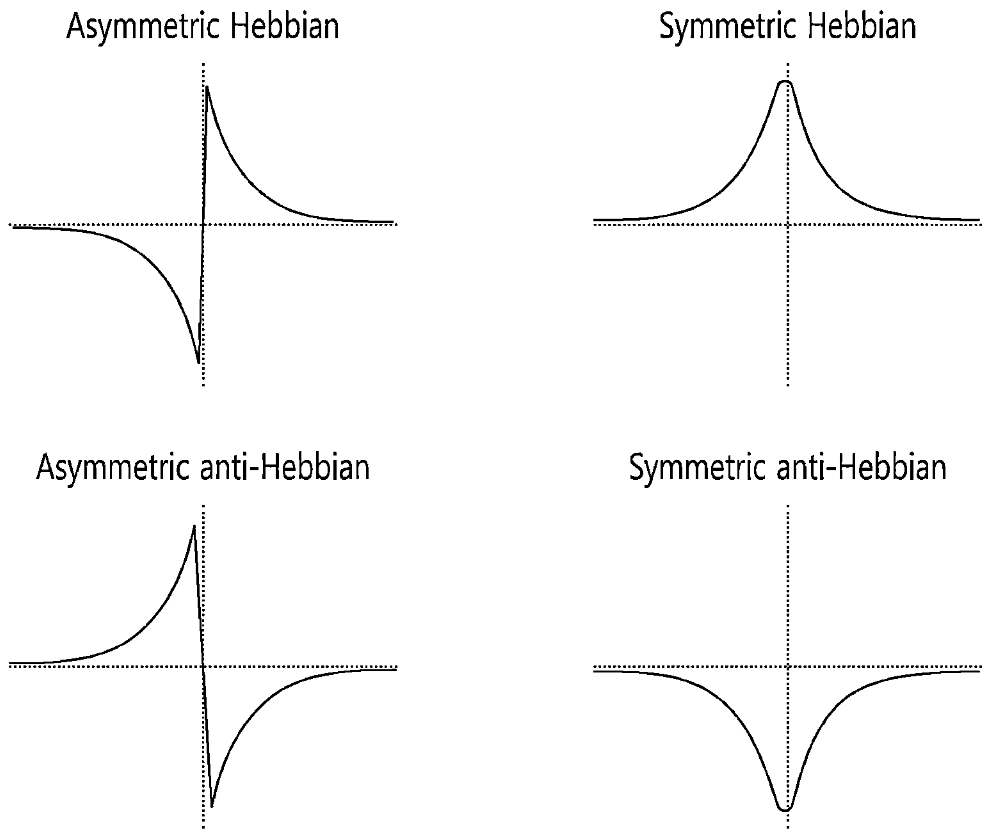

FIGS. 4A and 4B are exemplary diagrams illustrating a change in synaptic weight according to various types of STDP rules in an embodiment of the present invention.

FIG. 4A illustrates a change in synaptic weight over time, and FIG. 4B illustrates an example of long-term synaptic plasticity (STDP) rules observed in an actual biological brain.

Among various types of STDP rules, in an embodiment of the present invention, as illustrated in FIG. 4B, the unsupervised learning is performed on four combinations of asymmetric Hebbian, symmetric Hebbian, asymmetric anti-Hebbian, and symmetric anti-Hebbian, and the equation for the STDP model is shown in Equation 5 below.

$$\frac{dW}{dt} = \begin{cases} p \times (w\max - W) \times \exp^{\frac{-\Delta t}{\tau_p}}, & 0 < \Delta t \le 100 \\ d \times (W - w\min) \times \exp^{\frac{-\Delta[t]}{\tau_d}}, & \Delta t < 0 \text{ or } \Delta t > 100 \end{cases} \quad \text{[Equation 5]}$$

Here, W denotes a synaptic weight, p denotes a strengthening factor, d denotes a weakening factor, wmax denotes a maximum boundary, wmin denotes a minimum boundary, $\tau_p$ and $\tau_d$ denote strengthening and weakening effect time constants, and Δt denotes the pre- and post-synaptic spike time difference.

The learning unit 140 may provide inputs encoded with the rate code and the synchrony code to input layers of the neural network having various structures combined with such various STDP rules, and propagates the neural code to the final layer, and the synaptic weight may be self-updated according to the input based on the STDP rules.

Finally, the sound classification unit 150 performs the classification of sounds according to the propagation characteristics of the neural code using the test dataset according to the learning performance result of the learning unit 140.

In this case, when the learning performance of the learning unit 140 is completed, the sound classification unit performs the classification of the sounds using the test dataset finally selected by comparing each spiking neural network structure and the combination of the STDP rules.

Figure 5:
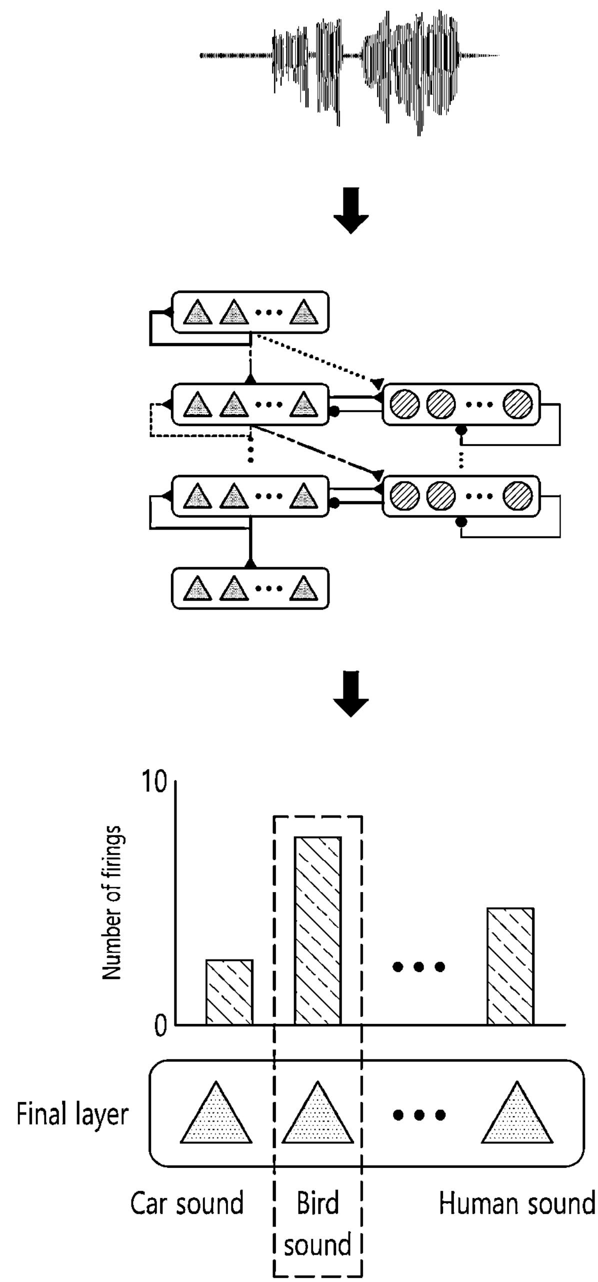
FIG. 5 is a diagram for describing a process of performing classification of sounds in an embodiment of the present invention.

FIG. 5 is a diagram for describing a process of performing classification of sounds in an embodiment of the present invention.

As illustrated in FIG. 5, when the learning of the learning unit 140, which performs individual learning on the combinations of various STDP rules and the spiking neural networks having various structures constructed using the learning dataset of the dataset that requires the classification operation, is completed, the classification of sounds is ultimately performed by assigning the input class for which the highest firing rate is recorded to each neuron in the output layer.

Hereinafter, a method of classifying sounds based on a neural code in a spiking neural network according to an embodiment of the present invention will be described with reference to FIGS. 6 to 10.

Figure 6:
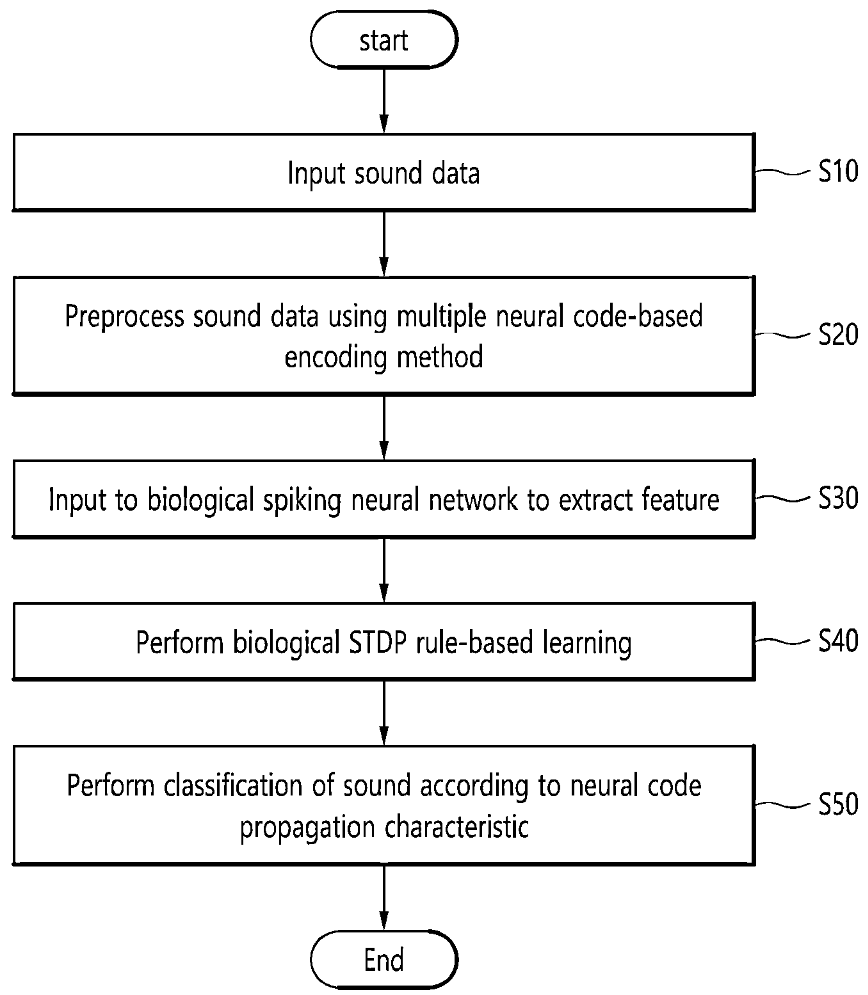
FIG. 6 is a flowchart illustrating an operation flow of a method of classifying sounds based on a neural code in a spiking neural network according to an embodiment of the present invention.

FIG. 6 is a flowchart illustrating an operation flow of the method of classifying sounds based on a neural code in a spiking neural network according to the embodiment of the present invention, and a specific operation of the present invention will be described with reference to this flowchart.

According to an embodiment of the present invention, first, the input conversion unit 110 receives sounds to be classified and digitally converts the sounds into sound data (S10).

That is, the received sounds are digitally converted to use the digitized sounds as input data.

Next, the preprocessing unit 120 preprocesses the digitally converted sound data in step S10 using a multiple neural code-based encoding method including the rate code encoding and the synchrony code encoding (S20).

In step S20, the preprocessing unit 120 is preprocessed by encoding a pitch of sound corresponding to a frequency with a rate code encoding for encoding a pitch of sound, and an intensity of sound corresponding to amplitude and a tone of sound corresponding to a waveform with a synchrony code encoding for encoding a timbre of sound.

Next, the feature extraction unit 130 inputs the sound data preprocessed in step S20 to the biological spiking neural network to extract features (S30).

In this case, in step S30, the rate code encoding result and the synchrony code encoding result are input to the biological spiking neural network to extract the features corresponding to the propagation pattern of the rate code and the propagation pattern of the synchrony code from the neural network, respectively.

Next, the learning unit 140 performs the biological STDP rule-based learning using the features extracted in step S30 (S40).

In step S40, the learning unit performs the unsupervised learning on each of the extracted features in step S30 for each combination of one or more predefined STDP rules.

In this case, the STDP rule may be predefined in a combination of Hebbian STDP and anti-Hebbian STDP determining a ratio of strengthening and weakening of synapses or symmetric STDP and asymmetric STDP determining whether to strengthen or weaken synapses depending on which of the two neurons generates the spike first.

In addition, the output of the spiking neural network is determined according to the spike response of the final layer, and may be classified by synthesizing the propagation result of the rate code and the propagation result of the synchrony code.

Figure 7:
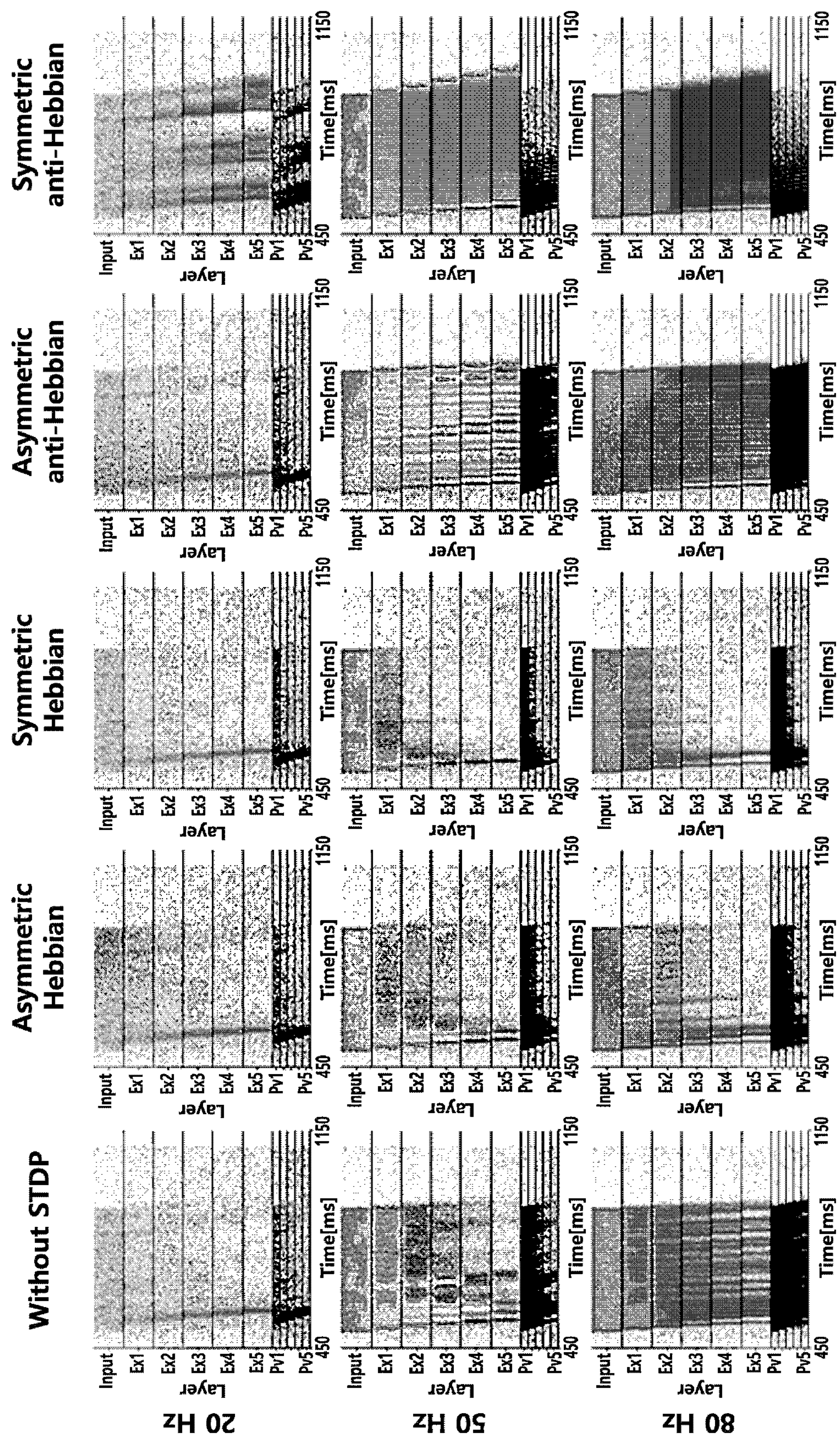
FIG. 7 is a diagram illustrating the propagation pattern of the rate code for each combination of STDP rules according to an embodiment of the present invention.
Figure 8:
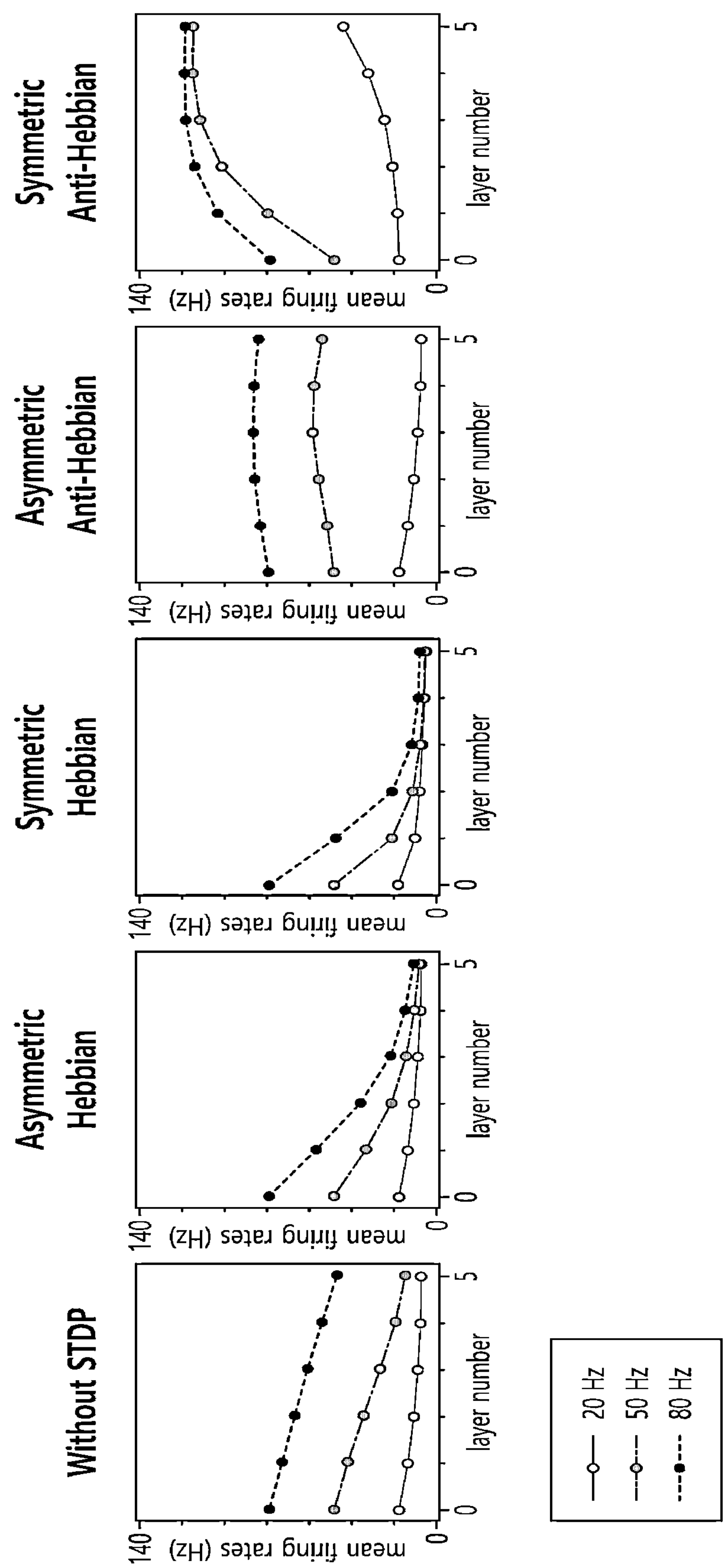
FIG. 8 quantitatively illustrates the propagation pattern of FIG. 7 as a graph of a change in average firing rate for each layer.

FIG. 7 is a diagram illustrating the propagation patterns of the rate codes for each combination of the STDP rules according to an embodiment of the present invention, and FIG. 8 quantitatively illustrates the propagation pattern of FIG. 7 as a graph of a change in average firing rate for each layer.

Describing FIG. 7 in detail, FIG. 7 illustrates the spike timing of individual neurons by frequency in the propagation patterns of the rate codes for each combination of the STDP rules, where EX spike means excitatory spike and IN spike means inhibitory spike. Also, in the graph, an x-axis represents time, and a y-axis represents a layer number.

Here, Without STDP is the conventional method in which the STDP rules are not considered and the propagation pattern of the trained rate code is represented, and the asymmetric Hebbian, the symmetric Hebbian, the asymmetric anti-Hebbian, and the symmetric anti-Hebbian each represent the propagation patterns of each trained rate code for the combination of each STDP rule according to the embodiment of the present invention.

As can be seen by referring to FIG. 8, which quantitatively illustrates the propagation pattern of FIG. 7, in the Without STDP which is the conventional method without considering the STDP rule, it can be seen that a frequency gradually decreases towards later layers compared to a first layer in all frequency bands, and that the combination of asymmetric anti-Hebbian STDP rules shows the best performance as it continues similarly to the last layer without a large change in frequency. In addition, the combination of the symmetric anti-Hebbian STDP rules confirms that the frequency gradually increases toward the later layers.

In this case, in FIG. 8, an x-axis represents the layer number, and a y-axis represents an average frequency.

Figure 9:
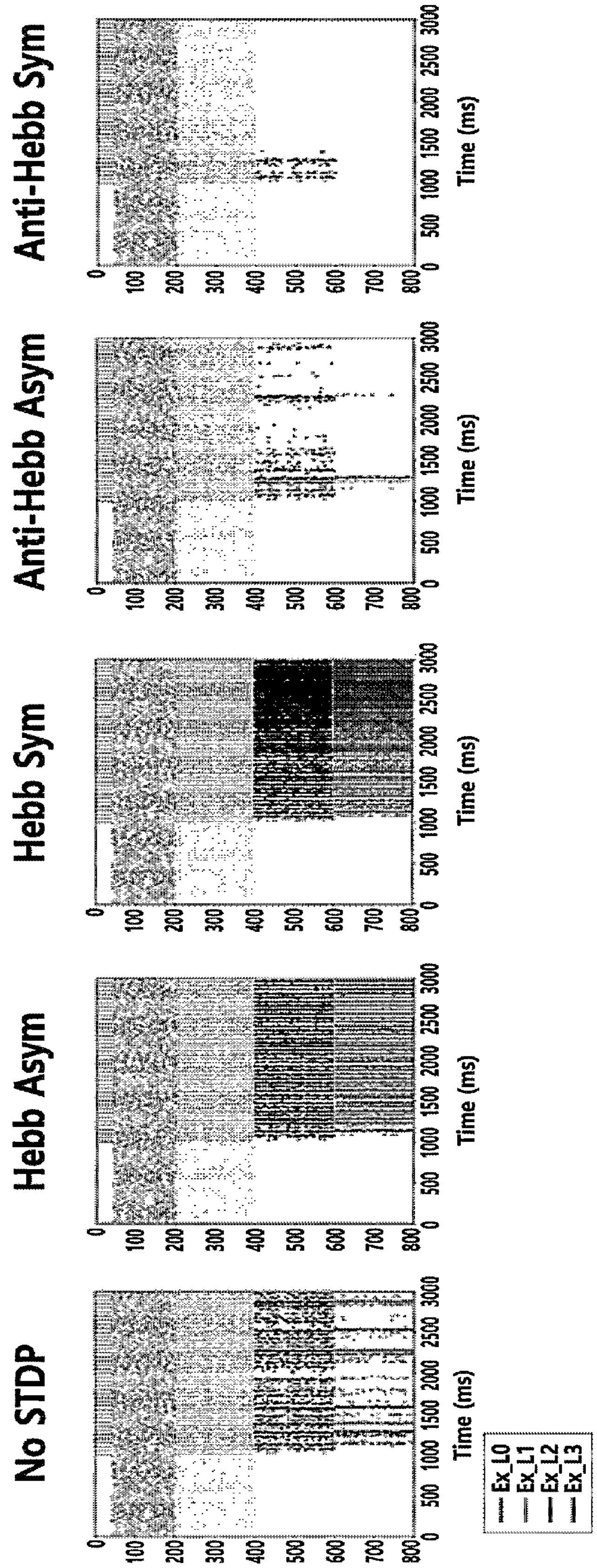
FIG. 9 is a diagram illustrating the propagation pattern of the synchrony code for each combination of STDP rules according to an embodiment of the present invention.
Figure 10:
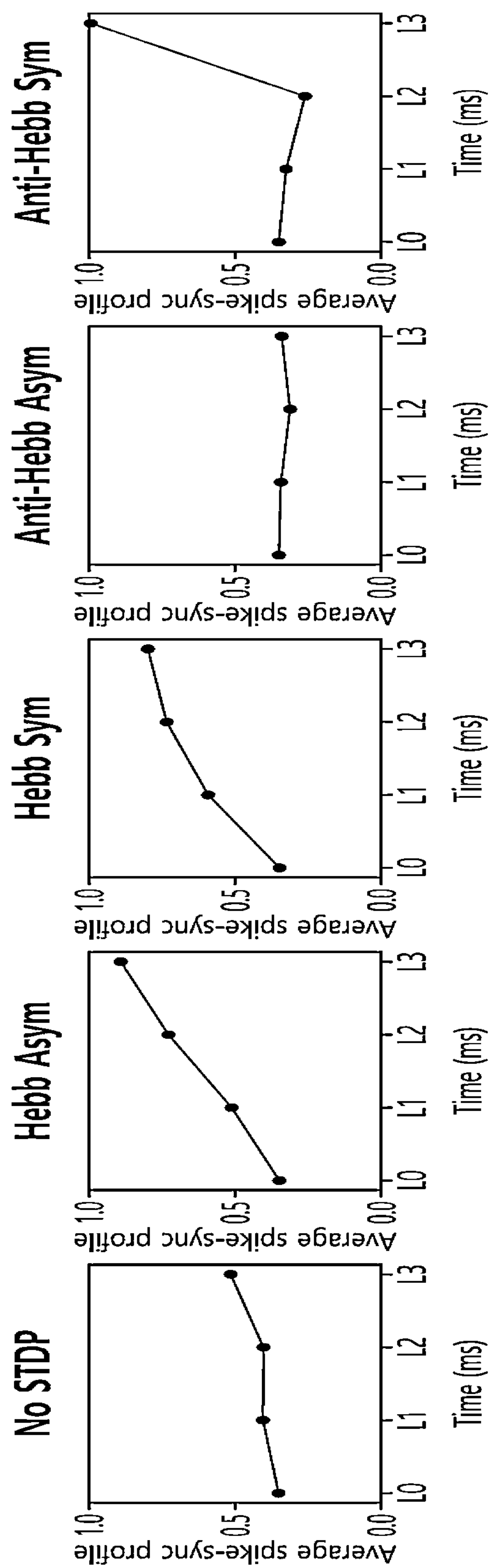
FIG. 10 quantitatively illustrates the propagation pattern of FIG. 9 as a graph of a change in synchronization degree for each layer.

FIG. 9 is a diagram illustrating the propagation patterns of the synchrony codes for each combination of the STDP rules according to an embodiment of the present invention, and FIG. 10 quantitatively illustrates the propagation pattern of FIG. 9 as a graph of a change in synchronization degree for each layer.

Describing FIG. 9 in detail, FIG. 9 illustrates the spike timing of individual neurons in the propagation patterns of the synchrony codes for each combination of the STDP rules. Similar to FIG. 7, in the graph, the x-axis represents time, and the y-axis represents the layer number.

Here, the Without STDP is the conventional method in which the STDP rules are not considered and the propagation pattern of the trained synchrony code is represented, and the asymmetric Hebbian, the symmetric Hebbian, the asymmetric anti-Hebbian, and the symmetric anti-Hebbian each represent the propagation patterns of each trained synchrony code for each combination of the STDP rules according to the embodiment of the present invention.

FIG. 10 quantitatively illustrates the propagation pattern of FIG. 9 as a graph showing a synchronization degree that changes through layers. In FIG. 10, the x-axis represents time and the y-axis represents an average spike synchronization profile.

Finally, the sound classification unit 150 performs the classification of sounds according to the propagation characteristics of the neural code using the test dataset according to the learning performance result in step S40 (S50).

In detail, when the learning performance in step S40 is completed, the classification of the sounds is performed using a finally selected test dataset by comparing each spiking neural network structure and the combination of the STDP rules.

In detail, when the learning is completed on the entire training dataset for each combination, the classification performance of each neural network is evaluated using the test dataset. In this case, the final output of the spiking neural network for the input classifies the type of sound (e.g., car sound, bird sound, human sound, etc.) using a label of a neuron for which the highest firing rate is recorded in the neuron of the output layer for each input.

That is, by comparing each spiking neural network structure and the combination of the STDP rules, the most suitable neural network structure and the combination of the learning rules for the dataset may be finally selected and used for the final classification task.

As described above, according to the apparatus for classifying sounds based on a neural code in a spiking neural network and a method thereof according to the embodiment of the present invention, by using an encoding method of pitch and timbre corresponding to a rate code and a synchrony code, respectively, based on a biological encoding method of sound inputs in a spiking neural network to utilize a differences in characteristics of complex and subtle sound inputs for learning the spiking neural network, it is possible to improve the performance of a classification operation.

In addition, according to the embodiment of the present invention, by using STDP learning rules adjusting individual synaptic weights according to a difference in occurrence time of spikes in pre-synaptic and post-synaptic neurons considered as a learning mechanism of a biological brain to use a learning method directly applicable to a spiking neural network, it is possible to reduce the amount of computation necessary for learning.

In addition, according to the embodiment of the present invention, by implementing a spiking neural network based on biological facts such as excitatory neurons, various inhibitory neurons, and network connectivity to perform feature extraction learning in a biological structure, it is possible to secure high compatibility with various biological learning rules and encoding techniques and expect scalability.

Although the present invention has been described with reference to embodiments shown in the accompanying drawings, it is only an example. It will be understood by those skilled in the art that various modifications and equivalent other exemplary embodiments are possible from the present invention. Accordingly, an actual technical scope of the present invention is to be determined by the spirit of the appended claims.

The invention claimed is:

1. A method of classifying sounds using an apparatus for classifying sounds based on a neural code in a spiking neural network, the method comprising:

receiving sounds to be classified and digitally converting the received sounds into sound data;

preprocessing the sound data using a multiple neural code-based encoding method including both rate code encoding to represent pitch and synchrony code encoding to represent sound intensity and timbre;

inputting the rate code-encoded sound data and the synchrony code-encoded sound data into a biological spiking neural network configured to process each type of neural code along separate propagation pathways;

extracting features from neuron activity corresponding to distinct propagation patterns of the rate and synchrony codes;

performing biological spike timing-dependent plasticity (STDP) rule-based learning using the extracted features, wherein STDP rules are applied differently to respective propagation patterns of the rate code and the synchrony code; and classifying the sounds based on differences in neural code propagation characteristics using a test dataset derived from a result of the STDP rule-based learning.

2. The method of claim 1, wherein preprocessing the sound data comprises encoding a pitch of sound corresponding to a frequency using the rate code encoding, and encoding an intensity of the sound corresponding to amplitude and a tone color of the sound corresponding to waveform characteristics using the synchrony code encoding.

3. The method of claim 1, wherein extracting features comprises inputting both a rate code encoding result and a synchrony code encoding result into the biological spiking neural network, and extracting respective propagation patterns associated with each encoding from neural activity.

4. The method of claim 1, wherein performing biological STDP rule-based learning comprises applying unsupervised learning separately to each extracted propagation pattern using one or more predefined STDP rules.

5. The method of claim 4, wherein the predefined STDP rules comprise a combination of Hebbian STDP and anti-Hebbian STDP that controls a ratio of synaptic strengthening and weakening, or symmetric STDP and asymmetric STDP that determines synaptic modification based on which of two neurons fires first.

6. The method of claim 1, wherein the classifying the sounds comprises selecting the test dataset based on a comparison of classification results across different spiking neural network structures and STDP rule combinations, and using the selected test dataset to perform final sound classification.

* * * * *